US011971790B2

(12) United States Patent
Chakrabarty et al.

(10) Patent No.: US 11,971,790 B2
(45) Date of Patent: Apr. 30, 2024

(54) ONLINE FAULT DETECTION IN RERAM-BASED AI/ML (71) Applicant: Nvidia Corporation, Santa Clara, CA (US)

(72) Inventors: Krishnendu Chakrabarty, Chapel Hill, NC (US); Mengyun Liu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 87 days.

(21) Appl. No.: 17/410,709

(22) Filed: Aug. 24, 2021

(65) Prior Publication Data

US 2022/0066888 A1    Mar. 3, 2022

Related U.S. Application Data (60) Provisional application No. 63/069,885, filed on Aug. 25, 2020.

(51) Int. Cl.
| | |
|---|---|
| *G06F 11/30* | (2006.01) |
| *G06F 11/14* | (2006.01) |
| *G06F 11/16* | (2006.01) |
| *G06N 3/063* | (2023.01) |
| *G06N 20/10* | (2019.01) |

(52) U.S. Cl.
CPC ........ *G06F 11/165* (2013.01); *G06F 11/1438* (2013.01); *G06F 11/3062* (2013.01); *G06N 3/063* (2013.01); *G06N 20/10* (2019.01)

(58) Field of Classification Search
CPC .............. G06F 11/165; G06F 11/1438; G06F 11/3062; G06F 11/24; G06N 3/063; G06N 20/10; G06N 3/045; G06N 3/08
See application file for complete search history.

(56) References Cited

U.S. PATENT DOCUMENTS

| | | | |
|---|---|---|---|
| 7,228,441 B2 | 6/2007 | Fung | |
| 11,158,369 B2 * | 10/2021 | Sharon | ................... G11C 15/02 |
| (Continued) | | | |

OTHER PUBLICATIONS

L. Xia, Mengyun Liu, Xuefei Ning, K. Chakrabarty and Yu Wang, "Fault-tolerant training with on-line fault detection for RRAM-based neural computing systems," 2017 54th ACM/EDAC/IEEE Design Automation Conference (DAC), Austin, TX, USA, 2017, pp. 1-6 (Year: 2017).*

(Continued)

*Primary Examiner* — Matthew M Kim
*Assistant Examiner* — Kyle Emanuele (57) ABSTRACT

The disclosure describes a method of monitoring the dynamic power consumption of ReRAM crossbars and determines the occurrence of faults when a changepoint is detected in the monitored power-consumption time series. Statistical features are computed before and after the changepoint and train a predictive model using machine-learning techniques. In this way, the computationally expensive fault localization and error-recovery steps are carried out only when a high fault rate is estimated. With the proposed fault-detection method and the predictive model, the test time is significantly reduced while high classification accuracy for well-known AI/ML datasets using a ReRAM-based computing system (RCS) can still be ensured.

21 Claims, 8 Drawing Sheets

(56) References Cited

U.S. PATENT DOCUMENTS

2020/0257936 A1* 8/2020 Ma .................... G06F 18/28
2023/0138586 A1* 5/2023 Hong .................. G06F 3/0619
  711/162

OTHER PUBLICATIONS

L. Xia, M. Liu, X. Ning, K. Chakrabarty and Y. Wang, "Fault-Tolerant Training Enabled by On-Line Fault Detection for RRAM-Based Neural Computing Systems," Sep. 2019 in IEEE Transactions on Computer-Aided Design of Integrated Circuits and Systems, vol. 38, No. 9, pp. 1611-1624 (Year: 2019).*
McKee; "Reflections on the Memory Wall"; Proceedings of the 1st Conference on Computing Frontiers; ACM; 2004; 6 pgs.
Chi, et al.; "Prime: A Novel Processing-in-memory Architecture for Neural Network Computation in ReRAM-based Main Memory"; ACM/IEEE 43rd Annual International Symposium on Computer Architecture; IEEE Computer Society; 2016; 13 pgs.
Degraeve, et al.; "Causes and consequences of the stochastic aspect of filamentary RRAM"; Microelectronic Engineering; 2015; 5 pgs.
Chen, et al.; "RRAM Defect Modeling and Failure Analysis Based on March Test and a Novel Squeeze-Search Scheme"; IEEE Transactions on Computers; Jan. 2015; 11 pgs.
Fieback, et al.; "Device-Aware Test: A New Test Approach Towards DPPB Level"; International Test Conference; 2019; 10 pgs.
Beckmann, et al.; "Nanoscale Hafnium Oxide RRAM Devices Exhitit Pulse Dependent Behavior and Multi-level Resistance Capability"; Materials Research Society; 2016; 8 pgs.
Kannan, et al.; "Sneak-path Testing of Memristor-based Memories"; 26th International Conference on VLSI Design and 12th International Conference of Embedded Systems; 2013; 6 pgs.
Gebregiorgis, et al.; "Testing of Neuromorphic Circuits: Structural vs Functional"; International Test Conference; 2019; 10 pgs.
Li, et al.; "ICE: Inline Calibration for Memristor Crossbar-based Computing Engine"; Design, Automation & Test in Europe Conference & Exhibition; 2019; 4 pgs.
Wang, et al.; "i2WAP: Improving Non-Volatitle Cache Lifetime by Reducing Inter- and Intra-Set Write Variations"; IEEE International Symposium on High Performance Computer Architecture; 2013; 12 pgs.
Xia, et al.; "Fault-Tolerant Training with On-Line Fault Detection for RRAM-Based Neural Computing Systems"; Design Automation Conference; 2017; 6 pgs.
Xia, et al.; "Fault-Tolerant Training Enabled by On-Line Fault Detection for RRAM-Based Neural Computing Systems"; IEEE Transactions on Computer-Aided Design of Integrated Circuits and Systems; Sep. 2019; 14 pgs.
Liu, et al.; "Fault Tolerance for RRAM-Based Matrix Operations"; International Test Conference; 2018; 10 pgs.
Liu, et al.; "Algorithmic Fault Detection for RRAM-Based Matrix Operations"; ACM Transactions on Design Automation of Electronic Systems; 2020; 31 pgs.
Wang, et al.; "Theory study and implementation of configurable ECC on RRAM memory"; 15th Non-Volatile Memory Technology Symposium; 2015; 3 pgs.
Chen, et al.; "NeuroSim: A Circuit-Level Macro Model for Benchmarking Neuro-Inspired Architectures in Online Learning"; IEEE Transactions on Computer-Aided Design of Integrated Circuits and Systems; Dec. 2018; 14 pgs.
Shafiee, et al.; "Isaac: A Convolutional Neural Network Accelerator with In-Situ Analog Arithmetic in Crossbars"; AMC/IEEE 43rd Annual International Symposium on Computer Architecture; 2016; 13 pgs.
Zhang, et al.; "Design Guidelines of RRAM based Neural-Processing-Unit: A Joint Device-Circuit-Algorithm Analysis"; Design Automation Conference; 2019; 6 pgs.
Yuan, et al.; "A New Memetic Algorithm with Fitness Approximation for the Defect-Tolerant Logic Mapping in Crossbar-Based Nanoarchitectures"; IEEE Transactions on Evolutionary Computation; Dec. 2014; 14 pgs.
Han, et al.; "Deep Compression: Compressing Deep Neural Networks with Pruning, Trained Quantization and Huffman Coding"; Conference paper at ICLR; 2016; 14 pgs.
Xia, et al.; "Stuck-at Fault Tolerance in RRAM Computing Systems"; IEEE Journal on Emerging and Selected Topics in Circuits and Systems; Mar. 2018; 14 pgs.
Liu, et al.; "Rescuing Memristor-based Neuromorphic Design with High Defects"; Design Automatic Conference; 2017; 6 pgs.
Ferro, et al.; "Analysis of GPU Power Consumption Using Internal Sensors"; Workshop on Computer and Communication Systems; Jan. 2017; 15 pgs.
Jin, et al.; "Changepoint-Based Anomaly Detection for Prognostic Diagnosis in a Core Router System"; IEEE Transactions on Computer-Aided Design of Integrated Circuits and Systems; Jul. 2019; 14 pgs.
Scott, et al.; "A Cluster Analysis Method for Grouping Means in the Analysis of Variance"; Biometrics; Sep. 1974; 7 pgs.
Killick, et al.; "Optimal detection of changepoints with a linear computational cost"; Journal of the American Statistical Association; Oct. 10, 2012; 25 pgs.
Altmann, et al.; "Permutation importance: a corrected feature importance measure"; Bioinformatics; Apr. 12, 2010; 8 pgs.
LeCun, et al.; "Gradient-Based Learning Applied to Document Recognition"; Proceedings of the IEEE; 1998; 47 pgs.
Torralba, et al.; "80 Million Tiny Images: A Large Data Set for Nonparametric Object and Scene Recognition"; IEEE Transactions on Pattern Analysis and Machine Intelligence; Nov. 2008; 13 pgs.
Simonyan, et al.; "Very Deep Convolutional Networks for Large-Scale Image Recognition"; Conference Paper at ICLR; 2015; 14 pgs.
Chai, et al.; "Root mean square error (RMSE) or mean absolute error (MAE)?—Arguments against avoiding RMSE in the literature"; Geoscientific Model Development; 2014; 4 pgs.
Li, et al.; "Memristor-based Approximated Computation"; IEEE International Symposium on Low Power Electronics and Design; 2013; 6 pgs.

* cited by examiner

ONLINE FAULT DETECTION IN RERAM-BASED AI/ML

CROSS-REFERENCE TO RELATED APPLICATION

This application claims the benefit of U.S. Provisional Application Ser. No. 63/069,885, filed by Krishnendu Chakrabarty, et al. on Aug. 25, 2020, entitled "ONLINE FAULT DETECTION IN RERAM-BASED AI/ML," commonly assigned with this application and incorporated herein by reference in its entirety.

TECHNICAL FIELD

This application is directed, in general, to a ReRAM devices and, more specifically, to on-line detection of faults in ReRAM devices.

BACKGROUND

Machine learning is now widely used in a variety of domains, and brain-inspired neural computing is considered to be one of the most powerful applications of machine learning. Currently, neural networks (NN), such as deep neural networks (DNN) are mainly implemented based on von-Neumann architectures. In von-Neumann architectures, the processor and memory are separate and data moves between them. The data-transporting latency, however, is now becoming the bottleneck referred to as the "memory wall".

In addition to the "memory wall", the energy efficiency gap between application requirements and what can be realized with hardware implementations continues to grow. Emerging devices such as metal-oxide resistive switching random-access memory (ReRAM) and associated crossbar arrays provide the basis for a promising architecture for brain-inspired circuits and systems. ReRAM is an example of neuromorphic hardware that is attractive due to relative fast speed, low energy consumption, and multi-bit storage. By exploiting the crossbar structure, a ReRAM-based computing system (RCS) can realize vector-matrix multiplication in analog form and reduce computational complexity from O(n2) to O(1). Moreover, since ReRAM provides memory for data storage, RCS provides an attractive solution for computing-in-memory. The ReRAM architecture eliminates the high data-transportation overhead that is inherent in von Neumann architectures; and significantly boosts energy efficiency, particularly for neural computing applications.

SUMMARY

In one aspect, the disclosure provides an on-line method of detecting hardware faults in a ReRAM-based neural network. In one example, the on-line method of detecting includes: (1) monitoring dynamic power consumption of a ReRAM crossbar of a neural network during operation of the neural network, (2) estimating a percentage of faulty cells of the ReRAM crossbar when detecting a changepoint in the dynamic power consumption during the monitoring, and (3) performing error recovery on the ReRAM crossbar based on the percentage of faulty cells.

In another aspect, the disclosure provides a method of training a ML model for estimating a percentage of faulty cells in a ReRAM based neural network. In one example the method of training includes: (1) applying a known number of faults on a ReRAM crossbar of a neural network, wherein the known number of faults corresponds to a known percentage of faulty cells for the ReRAM crossbar, (2) applying a known input to the neural network, (3) monitoring the neural network during processing of the known input, (3) extracting a dataset of features from the neural network during the monitoring, and (4) correlating the dataset of features with the known percentage of faulty cells.

In yet another aspect, the disclosure provides a ReRAM crossbar. In one example, the ReRAM crossbar includes: (1) an array of ReRAM cells and (2) monitoring circuitry configured to monitor dynamic power consumption of the array of ReRAM cells.

BRIEF DESCRIPTION

The accompanying Figures, Examples, and Appendix are provided by way of illustration and not by way of limitation. The foregoing aspects and other features of the disclosure are explained in the following description, taken in connection with the accompanying example figures (also "FIG.") relating to one or more embodiments.

DETAILED DESCRIPTION

A ReRAM-based computing system (RCS) based on crossbars can be used to provide an energy-efficient hardware implementation of vector-matrix multiplication for artificial intelligence (AI) and machine-learning (ML) hardware. A RCSs provides an attractive hardware solution for neuromorphic computing. For example, a well-trained NN can be mapped to the conductance of a RCS in order to carry out the neuromorphic computing. However, RCSs are vulnerable to faults due to the immature ReRAM fabrication process. The faults can be soft faults and/or hard faults. Soft faults are caused by variations associated with fabrication techniques and write operations. For hard faults, the resistance of a ReRAM cell cannot be changed; this category includes the stuck-at-0 (SA0) and stuck-at-1 (SA1) faults caused by, for example, fabrication techniques, over-forming defects, and limited endurance.

The existence of ReRAM faults makes the mapping imprecise, and can affect performance accuracy. Manufacturing tests can be performed but ReRAM cells have shown that even after passing manufacturing tests, faults can still appear in the field during read and write operations because of the limited write endurance of ReRAM cells. Existing methods for identifying faults after shipment and implementation of a ReRAM chip can be time-consuming and inefficient.

For example, existing techniques for improving the reliability of RCS are focused either at the circuit level or at the level of a single crossbar array. However, the severity of the reliability problems of a crossbar can be closely related to many system-level details such as overall functionality, input patterns, workload, etc. Hence, there is an ongoing need for improved fault detection that provides a system-level reliability assessment and resilience enhancement solutions for ReRAM-based computing systems.

Figure 2:
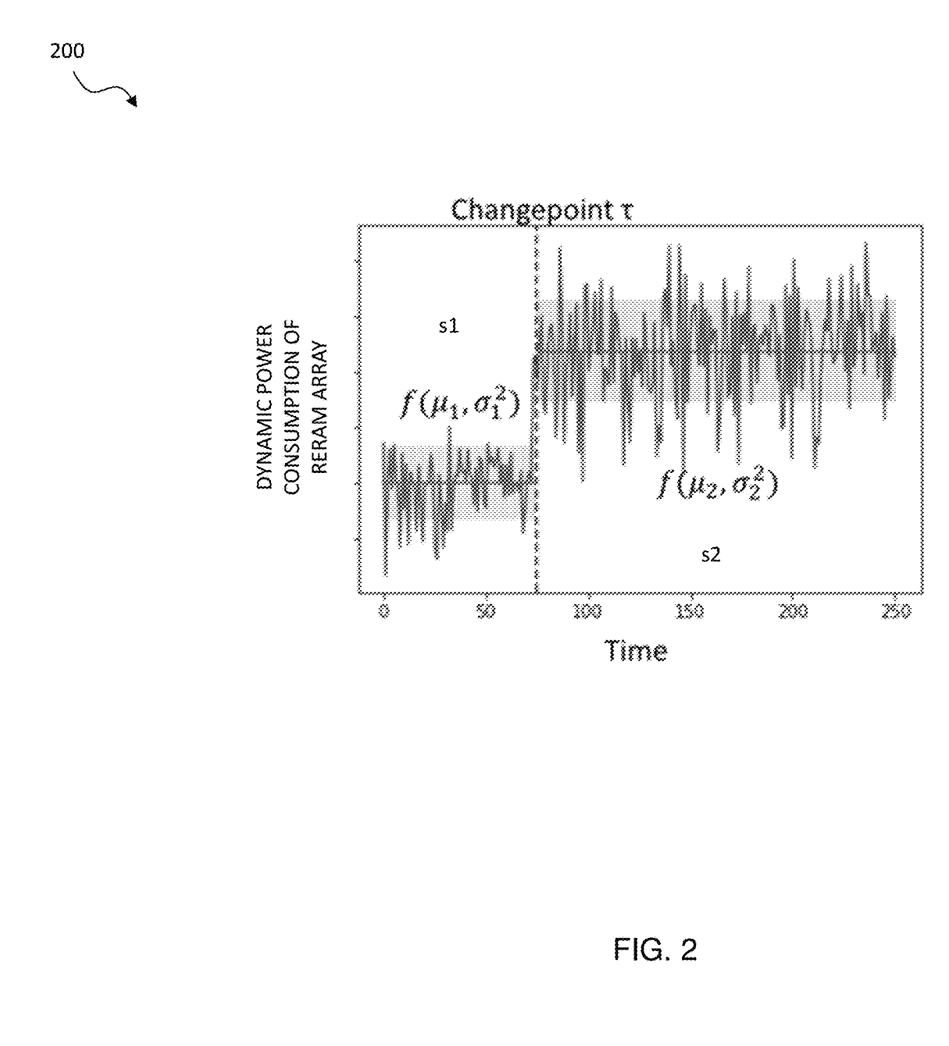
FIG. 2 illustrates a graph of dynamic power consumption of a ReRAM array within a time window and visually represents a changepoint in the dynamic power consumption.

The disclosure provides a system level on-line fault-detection method for RCS. Most existing on-line detection methods carry out the testing process after every fixed number of computing cycles. Periodic detection, however, introduces considerable overhead, especially when there are infrequent errors. The disclosure recognizes that ReRAM faults affect the dynamic power consumption of ReRAM crossbars and exploits this realization by monitoring the dynamic power consumption of ReRAM crossbars. The monitoring can be via direct or indirect measurements. The disclosed on-line fault-detection method determines the occurrence of faults when a changepoint is detected in the monitored power consumption and invokes the time-consuming fault localization and correction steps based on an estimated percentage of faulty cells of the ReRAM crossbars when detecting a changepoint. In this way, the computationally expensive fault localization and error-recovery steps can be carried out based on the estimated percentage of faulty cells. The error recovery can occur and may only be carried out when the percentage of estimated faulty cells is greater than a predetermined threshold. The threshold can be user determined based on different applications. A lower threshold can ensure high fault coverage, but lead to the increment of error recovery time. A higher threshold can lead to less interruption, but may lead to some accuracy drop in AI applications. A user, therefore, can analyze the tradeoffs and determine the threshold. A changepoint is a location of an abrupt change in time-series data of the dynamic power consumption. FIG. 2 illustrates a visual representation of a changepoint as used herein.

In order to estimate the percentage of faulty cells in a faulty ReRAM crossbar a machine learning model is trained. Various faults are injected for the training while executing application workloads and statistical features are computed before and after a changepoint is detected. The statistical features include the power consumption profile and are used to train a predictive model via machine-learning techniques. The statistics of the power consumption profile can be used as independent variables and the percentage of faulty cells as dependent variables. With the proposed fault-detection method and the predictive model, the test time can be significantly reduced, while high classification accuracy for well-known AI/ML datasets using RCS can still be ensured.

Figure 1:
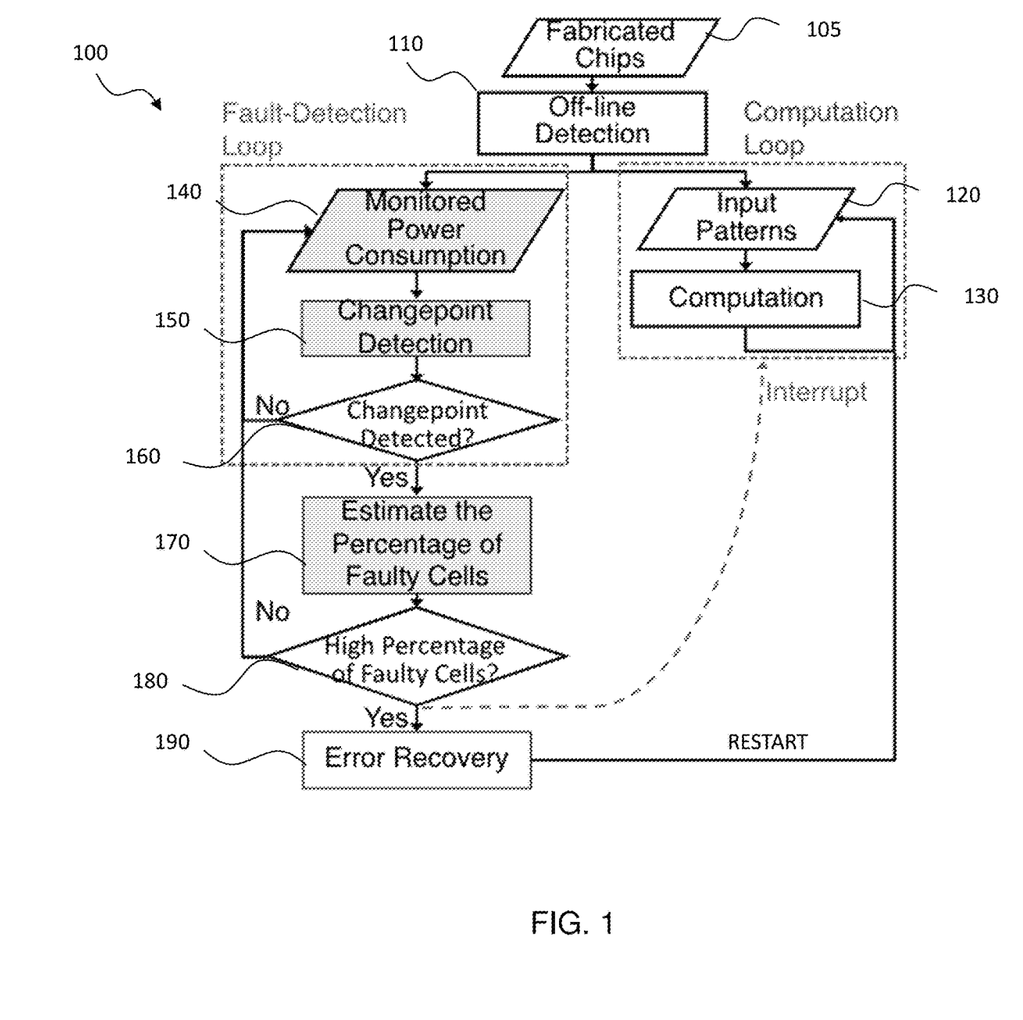
FIG. 1 illustrates a flow chart of an example of an on-line method for detecting hardware faults in a ReRAM-based neural network.

FIG. 1 illustrates a flow chart of an example of an on-line method 100 for detecting hardware faults in a ReRAM-based NN. The ReRAM-based NN is located on a chip. The method 100 includes two loops, a computation loop and a fault-detection loop, that operate in parallel, which includes at least substantially in parallel. The method 100 begins in step 105 with a fabricated chip (or chips) that includes at least one ReRAM crossbar. The chip can be manufactured in a conventional manner. After the chip is manufactured, off-line detection of faults on the chip is performed in step 110. The off-line detection includes manufacturing tests that are designed to detect manufacturing defects. Off-line testing occurs when functional operation is paused or during idle periods when no functional operations are carried out and special-purpose test inputs are applied. The off-line detection is typically performed at the foundry after fabrication and before shipment. After the manufacturer testing, the crossbar chips are typically shipped and employed in a processor, such as a GPU, for performing various computations. For example, the at least one crossbar can be used for vector multiplication. The chip can also be for a NN that classifies images and provides a classifying output.

Regardless the computations, input patterns are received by the ReRAM-based chip in step 120. The input patterns can be, for example, pixel data for image classification. The input patterns can also be a matrix for vector multiplication or another type of input dataset for processing by the ReRAM-based NN.

In step 130 the ReRAM-based NN performs computations. The computations are performed using the input patterns and can include, for example, image classifying or vector multiplication. Accordingly, the ReRAM-NN is operating on-line and performing computations. An output is provided by the computations. The output can be, for example, a classification result or a vector multiplication value. Steps 120 and 130 are the computation loop and continue to perform in a conventional manner as input patterns are received and processed.

During the computation loop, on-line fault detection is also being performed. On-line fault detection as used herein refers to a solution where fault detection is carried out during normal (functional) operations of the ReRAM-based NN. The on-line fault-detection loop includes steps 140, 150, and 160. In step 140, power consumption of the ReRAM-NN is monitored during operation, i.e., during the computations of step 130. The power consumption being monitored is dynamic power consumption of the at least one ReRAM crossbar during operation.

Figure 6:
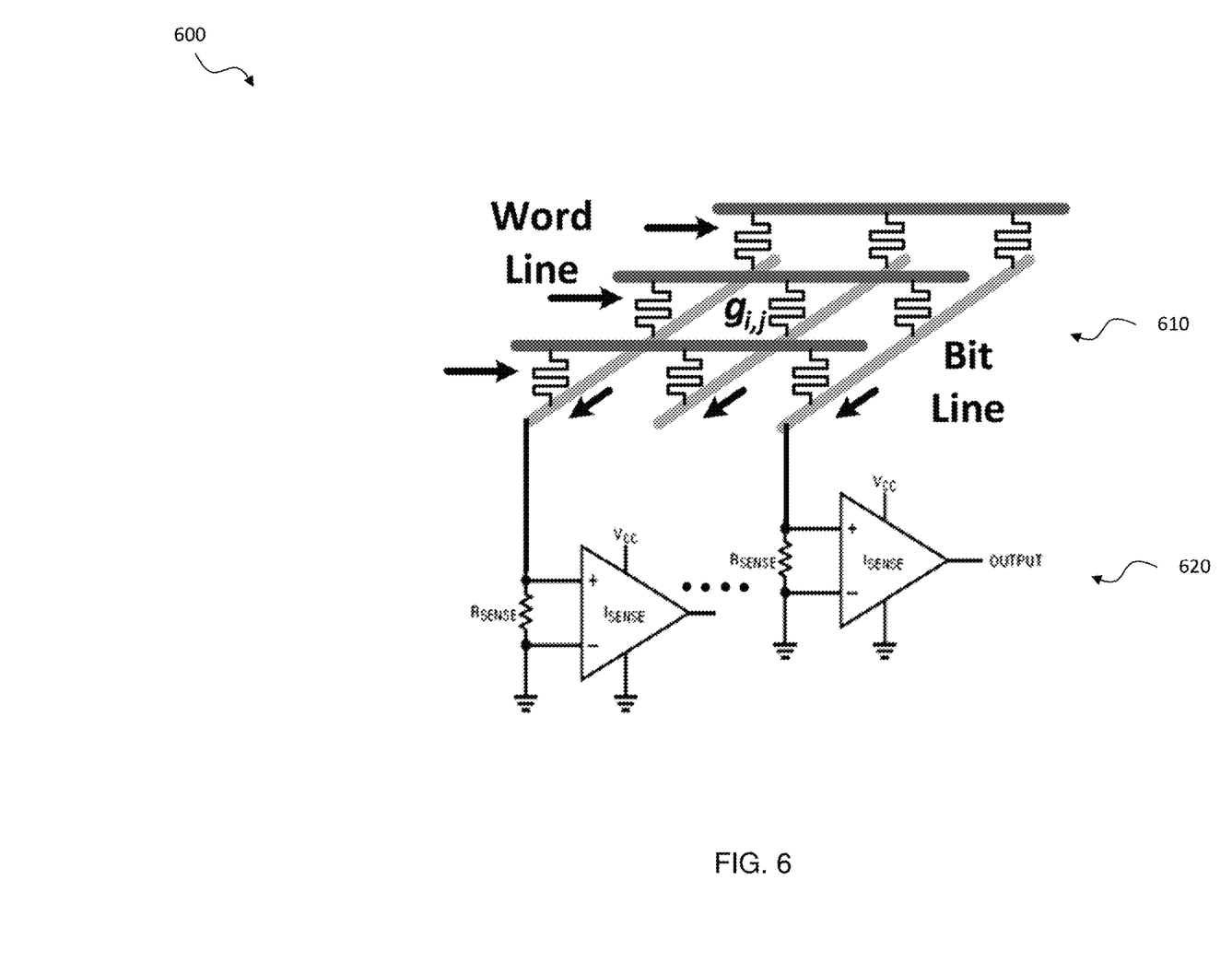
FIG. 6 illustrates a diagram of an example of using current sensors as monitoring circuitry, such as in the system of FIG. 5.

The monitoring of power consumption can be performed by employing one or more sensors for measuring the dynamic power consumption of the ReRAM crossbar The sensors can be current sensors located on the bit-lines of the ReRAM crossbar. FIG. 6 provides an example of using current sensors to directly monitor the dynamic power consumption on each of the bit lines.

Figure 7:
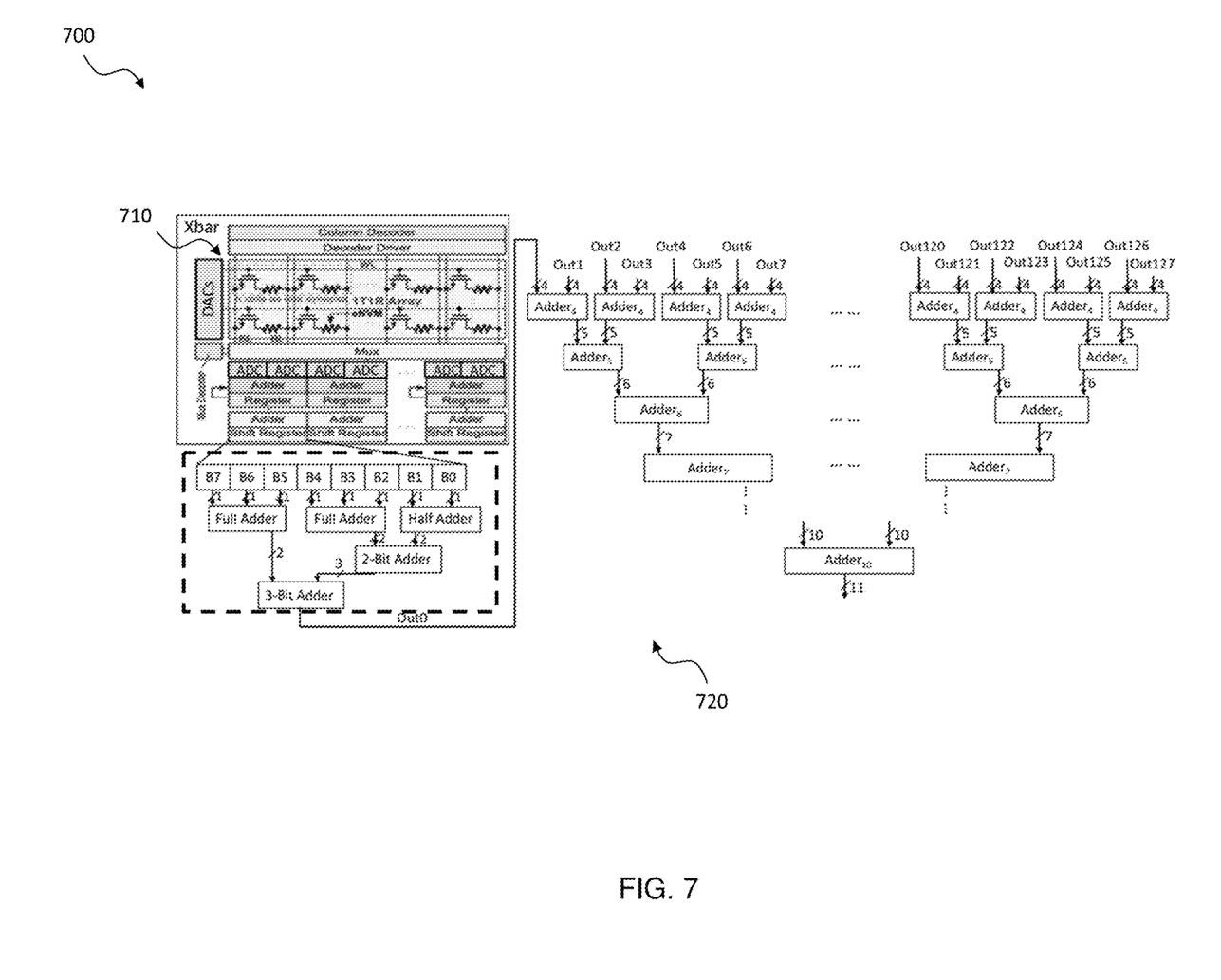
FIG. 7 illustrates a diagram of an example of using an adder tree as monitoring circuitry, such as in the system of FIG. 5.

Instead of direct measurement of the dynamic power consumption, the dynamic power consumption can also be monitored indirectly. For example, indirect monitoring can be performed by counting a number of logic ones output by the ReRAM crossbar. Counting the number of logic ones can be performed by an adder tree. FIG. 7 provides an example of an adder tree that can be connected to a ReRAM array and used for counting the logic ones.

In step 150, a process for detecting a changepoint in the monitored power consumption is performed. A changepoint is a location of an abrupt change in time-series data of the dynamic power consumption. The changepoint detection process occurs during the monitoring of step 140 and is repeated after an initial detection of a changepoint. Changepoint detection can be accomplished by identifying time points in the dynamic power consumption where the difference between the corresponding density functions is maximized. For on-line detection the change point detection process can be conducted within a time-window.

The disclosure recognizes that a large change in input patterns may also lead to a changepoint in the monitored time series, even though a ReRAM crossbar is fault-free. Therefore, a large change in input patterns may lead to fault-detection false alarms. In order to reduce false alarms, the following strategy for changepoint detection can be used. When a changepoint is detected, another test round is run. In this extra test round, (1) the data point at the changepoint from the time series is removed, (2) remaining data points in the current time-series segment are shuffled, and (3) the change point detection process is rerun. In such examples, the ReRAM crossbar can be deemed to be faulty only when a changepoint is detected in both test rounds. With additional computation requirements, more test rounds can be utilized to further reduce false alarms.

The discussion below with respect to FIG. 2 provides an example of a changepoint detection process according to the principles of the disclosure. As discussed below with respect to FIG. 2, on-line changepoint detection can also be used to detection gradual changes.

In step 160, a determination is made if a changepoint is detected. If a changepoint is not detected from the data obtained by the changepoint detection process of step 150, the method 100 continues to step 140 and the on-line fault detection loop continues. The computation loop also continues.

Figure 4:
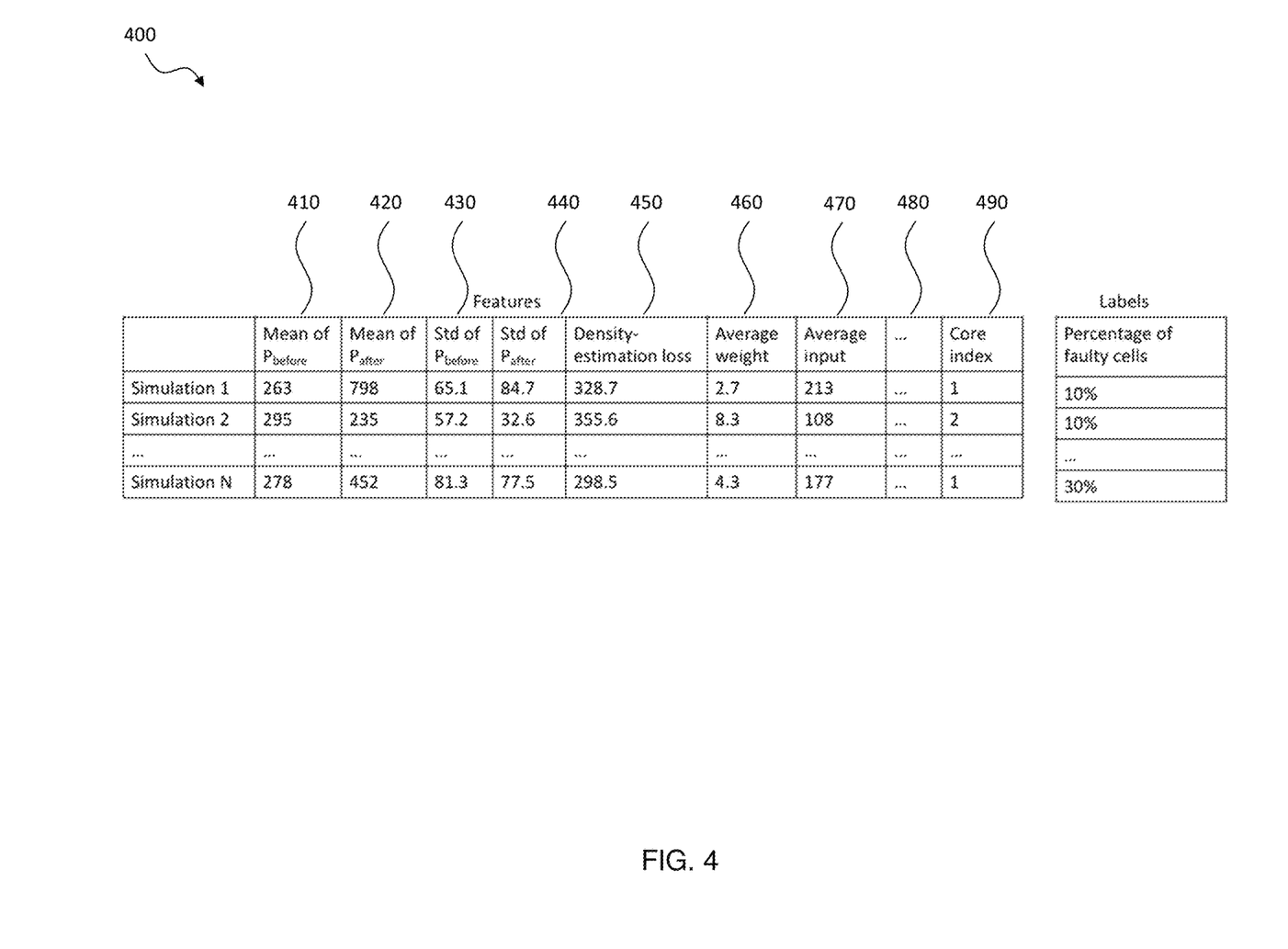
FIG. 4 illustrates a table providing an example of a dataset of features used for training and for estimating a percentage of faulty ReRAM cells.

When a changepoint is detected, method 100 continues to step 170 wherein a percentage of faulty cells of the at least one ReRAM crossbar is estimated. A trained model can be used for the estimation of the percentage of faulty cells. During the computation loop, features from the NN can be extracted and the extracted features can be used with the trained model for estimating the percentage of faulty cells. The features can include data from the dynamic power consumption, data from the input dataset or patterns, and data from the NN. The features, for example, can include one or more of a mean value of the power before and after the changepoint, a standard deviation value of the power before and after the changepoint, a density-estimation loss from mathematically determining the changepoint, average weight of parameters in the ReRAM crossbar, average value of input pixels, and a core index identifier. FIG. 4 illustrates a table showing an example of a dataset of features that can extracted during the computation loop and also can be used with the trained model for estimating a percentage of faulty cells. The model can be a Support Vector Machine (SVM)-based estimation model.

The method 100 continues to step 180 and a determination is made if the estimated percentage of faulty cells is high, i.e., greater than, or greater than or equal to a predetermined threshold. If not, the method 100 continues to step 140. When the estimated percentage is high, an interrupt is sent to the computation loop to stop the operation of the NN. A typical method, procedure, or mechanism can be used to stop the computations. For example, a signal can be sent to halt sending of the input dataset to the NN. The method 100 also continues to step 190 wherein error recovery steps are performed. The error recovery steps can be conventional measures, such as remapping and retraining. After the error recovery, the method 100 restarts the computation loop and the NN can continue to operate.

FIG. 2 illustrates a graph 200 of dynamic power consumption of a ReRAM array within a time window and visually represents a changepoint in the dynamic power consumption. A faulty ReRAM device has an incorrect conductance, and hence affects the output currents that go through the faulty device. The mean value and the standard deviation value of the dynamic power consumption are different with the existence of faults. These differences can be used to enable the detection of faults in ReRAM arrays.

In FIG. 2, a changepoint $\tau$ is denoted. The changes can be either positive as shown in FIG. 2 going from segment s1 to segment s2 or can be negative. These changes can be reflected in various statistical properties, e.g., mean, variance, trend, etc. Timeseries data can be viewed as a finite sequence of data points, which can be represented as D={d1, d2, •, dn}, where n is the length of sequence D. As shown in FIG. 2, changepoint T splits a time series into the two disjoint segments s1, s2 with probability density functions $f(\mu_1, \sigma^2_1)$ and $f(\mu_2, \sigma^2_2)$, respectively. Therefore, the problem of changepoint detection can be described as identifying time points in the dynamic power consumption where the difference between the corresponding density functions is maximized.

As noted above regarding step 140 of FIG. 1, dynamic power consumption can be monitored directly or indirectly. The disclosure recognizes that each ReRAM crossbar generates an output sequence, and each datapoint di is the number of logic ones in the corresponding output sequence. In the presence of faults, the ReRAM output current and the quantized outputs of the sense amplifiers change. Moreover, the corresponding outputs are converted to a sequence of binary values and stored in the output registers. Thus, in addition to direct monitoring of dynamic power consumption, the disclosure introduces indirect monitoring on the basis of the number of logic ones in the output sequences. The below discussion uses SAFs as examples of faults to demonstrate monitoring based on logic ones.

The fault-free output $O^*_t$ at cycle t is determined by the input patterns $V_{(i,t)}$ and the weights $G_{(i,j)}$ stored in the ReRAM crossbars:

$$O^*_t = \Sigma_{j=1}^C O^*_{t,j} = \Sigma_{j=1}^C \Sigma_{i=1}^R V_{(i,t)} G^*_{(i,j)} \qquad (1)$$

x where R and C are the number of rows and the number of columns in a ReRAM crossbar, respectively. Also $o^*_{t,j}$ refers to the output from the j-th column at cycle t. For inference tasks, the weights stored in ReRAMs are fixed after training. Therefore, the deviation between the output at cycle t and the output at cycle t−1 is given by:

$$\Delta O_t = O_t - O_{t-1} \qquad (2)$$

$$= \Sigma_{j=1}^C O_{t,j} - O_{t-1,j} \qquad (3)$$

$$= \Sigma_{i=1}^R \Delta V_{(i,t)} (\Sigma_{j=1}^C G_{(i,j)}) \qquad (4)$$

When the input patterns V(i,t) are considered to be a random variable and that it follows a normal distribution, the monitored output obeys a weighted normal distribution, where the weight is determined by G(i,j). When SAFs occur, the conductance G(i,j) changes. In this way, both the mean and the standard deviation of the output sequence change. For example, assume that the size of a ReRAM crossbar is 10×10, and the input is a random integer that follows a normal distribution $N(128, (128/3)^2)$. In the presence of SA0 faults, the mean and the standard deviation of the outputs both decrease; in the presence of SA1 faults, the mean and the standard deviation both increase. The outputs of one layer are sent to the next layer as inputs. The input voltage that is applied at the input of the transmission gates affect the dynamic read power of the ReRAM array and the wordline decoder. Therefore, the number of ones in an output sequence can be used as a simplified measure of dynamic power consumption. The adder-tree design such as illustrated in FIG. 7 can count the number of logic ones in the binary sequence.

As noted above, changepoint detection can be accomplished by identifying time points in the dynamic power consumption where the difference between the corresponding density functions is maximized. A changepoint can be detected by analyzing the probability distributions of data before and after a candidate changepoint. For example, as shown in FIG. 2 assume that a single changepoint $\tau$ divides time-series data D into two segments s1 and s2 with likelihood functions $p(s_1|\hat{m}_1)$ and $p(s_2|\hat{m}_2)$, where p(•) represents the probability density function, and $\hat{m}$ indicates the maximal likelihood estimation of the corresponding model. Therefore, the sum of log-likelihood function of s1 and s2 can be written as $L(\tau)=\log p(s_1|\hat{m}_1)+\log p(s_2|\hat{m}_2)$. Then the objective of finding an optimal changepoint $\tau^*$ can be formulated as maximizing the sum of log likelihood functions:

$$\tau^* = \underset{\tau=1,\ldots,n}{\mathrm{argmax}}\{L(\tau)\} \quad (5)$$

$$= \underset{\tau=1,\ldots,n}{\mathrm{argmax}}\{\log p(s_1|\hat{m}_1)+\log p(s_2|\hat{m}_2)\} \quad (6)$$

In order to extend the above framework from single changepoint detection to the detection of multiple changepoints, all possible combinations of different changepoints are needed to be considered to find the maximum likelihood. Both the number and locations of changepoints, however, can be unknown. If the length of the time-series data is n, the total number of possible changepoints combinations is $2^n$, wherein a brute-force search method is infeasible.

As such, the density-estimation-based method for detecting changepoints in a time series can be viewed as an offline method since it requires the availability of the complete time series. Hence it suffers from the drawback of high error-detection latency. Thus, regarding on-line detection of changepoints as in step 150, the goal is to detect the occurrence of faults as soon as possible, instead of waiting until the complete time series is obtained. In order to address this problem, a sliding window is used to select the current power-consumption segment, concatenate it to a fault-free segment, and detect changepoints in this newly concatenated time series. Assume that the current time-point is t and the size of the sliding window is set to m. Then the current segment $s_c$ can be represented as $s_c=\{d_{t-m+1}, \bullet\bullet\bullet, d_{t-1}, d_t\}$, and the fault-free segment can be represented as $s^*=\{d^*_0, d^*_1, \bullet\bullet\bullet, d^*_k\}$, where d* represents a fault-free datapoint. In this way, the concatenated time series can be represented as $s'_c=\{d^*_0, d^*_1, \bullet\bullet\bullet, d^*_k, d_{t-m+1}, \bullet\bullet\bullet, d_{t-1}, d_t\}$.

The density estimation based method can be utilized to detect changepoints in the concatenated time series $s'_c$. In this way, a changepoint can be identified within m cycles after the occurrence of this changepoint. The size of the sliding-window can affect the time and accuracy of changepoint detection. For example, a large sliding-window size (m) typically improves the accuracy of changepoint detection. However, a larger sliding-window also takes longer time for detecting the changepoint. The size of the sliding windows can be set, for example to m=50 for a balance of accuracy and processing time.

In classical changepoint-detection methods, the goal is to detect time points when the statistical characteristics of the data change abruptly. In many realistic scenarios, however, changes may not occur abruptly, but rather incrementally over consecutive periods of time; these changes can be referred to as gradual changes. When the number of faulty ReRAM cells increases gradually (e.g., due to wear out), a gradual change will appear in the time series corresponding to the power consumption. The method of concatenating the current segment with a fault-free segment, can also be used to detect gradual changes. Therefore, instead of directly applying the density estimation-based method, a current segment is concatenated with a fault-free segment. When a target ReRAM crossbar is faulty, a changepoint is detected in the new time series. In this way, gradual changes in the time series can be detected.

Figure 3:
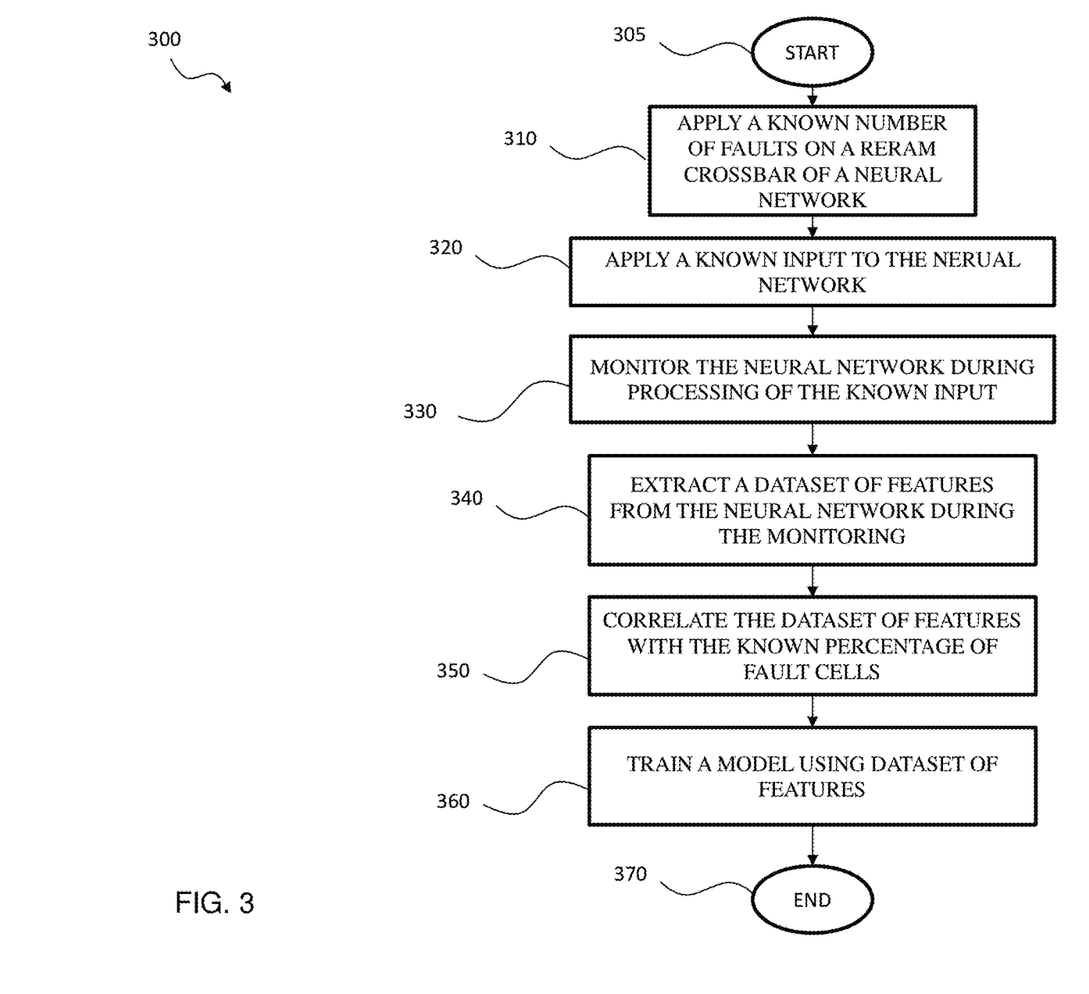
FIG. 3 illustrates a flow diagram of an example method of training a ML model for estimating a percentage of faulty cells in a ReRAM based neural network.

FIG. 3 illustrates a flow diagram of an example method 300 of training a ML model for estimating a percentage of faulty cells in a ReRAM based NN. When the percentage of faulty cells is low, NN may tolerate these faults by themselves. Accordingly, targeting ReRAM crossbars with a high percentage of faulty cells, which generally leads to large differences before and after a changepoint, can be beneficial. To train a specific estimation model, a known number of faults can be randomly inserted and a known input dataset applied. A new input dataset can be used to retrain a network.

For the training method 300, different percentage of faulty cells are injected to ReRAM devices, different application workloads are simulated, and features are collected. For training method 300, the average power before and after a changepoint, and the standard deviation before and after the changepoint can be selected as feature candidates. Density-estimation loss can also be a feature candidate. Moreover, a large weight matrix for a NN can be divided into multiple blocks and then mapped to multiple ReRAM crossbars. Faults in different weight blocks can affect a NN in different ways. Therefore, the index of a core (i.e., a core index identifier) can be selected as a feature candidate to construct the estimation model. The discrepancy between a real output and an ideal output is proportional to the deviation in conductance due to faulty ReRAM devices and to the input voltages. The average weight stored in the ReRAM crossbar and the average input to the corresponding ReRAM crossbar, therefore, can also be used as feature candidates.

At least some of the collected features are used to train a model. The dataset of features used for training can vary for different applications and NN. The method starts in step 305.

In step 310, a known number of faults are applied to a ReRAM crossbar of a NN. The known number of faults can be a percentage of faults based on, for example, the total number of cells of the ReRAM crossbar. The table of FIG. 4 illustrates examples of different percentages of faults that can be applied.

A known input is provided to the NN in step 320. The input can be pixelated data of an image or a dataset of other values for processing. Training is typically carried out with a given input dataset for multiple "epochs". Separate estimation models can be trained for different NN architectures and different input datasets.

In step 330, the NN is monitored during processing of the known input. The monitoring includes detecting changepoints during the computations of the NN. The monitoring and detection of changepoints can be performed as disclosed herein with respect to FIGS. 1-2 and the corresponding discussion.

A dataset of features are extracted from the NN during the monitoring and detecting of a changepoint in step 340. The feature dataset can be stored in a memory. The extracted dataset of features can include more features than used for training. As such, after statistics are collected, selecting a smaller set of the collected candidate features can be performed. The selection of features can be based on a permutation feature importance measurement, wherein a feature is deemed to be important if shuffling its values increases the model error, because, in this case, the model relies on the feature for the prediction. To compute the permutation feature importance, first, the original model error can be calculated and recorded as $Err_{orig}$. Next, for a target feature with index i, all the other features are kept the same, while randomly permuting the values of this feature, then re-calculate the model error, and record this value as $Err_i$. Finally, the permutation feature importance $FI_i$ is calculated for the i-th feature as: $FI_i=Err_i-Err_{orig}$. A large permutation feature importance ($FI_i$) indicates that the prediction error increases when the values of this feature are permuted that this feature is important.

In step 350 the determined training feature dataset is correlated with the known percentage of fault cells that were applied in step 310. A model is then trained in step 360. The dataset of features determined in step 340 can be used along with the known number of faults (or percentage thereof) from step 310. For each network architecture, a dedicated model can be trained for each layer in the network to estimate the percentage of ReRAM cells that are faulty. For each layer, the ReRAM crossbars that are used to store the weights corresponding to this layer are called target crossbars. In order to train the model, different faults are inserted to the target crossbars and simulations are run to collect training data. As discussed above, a fault-free segment can be concatenated to the current segment, and changepoints detected in the resulting concatenated time series. Therefore, to collect training data, the target crossbar can be assumed to have no faulty cell before the fault insertion. The machine learning-based estimation model can be a support vector regression (SVR) method. An SVR is a supervised machine-learning algorithm, which updates a weight vector by minimizing the loss over all samples. The SVR algorithm learns from the training data and constructs a model that outputs an estimate of the percentage of faulty ReRAM cells in a given faulty ReRAM crossbar. The method 300 continues to step 360 and ends.

FIG. 4 illustrates a table 400 providing an example of a dataset of features used for training, such as in method 300 of FIG. 3. The listed features can be the dataset of features that are used for training or candidate features from which the training feature dataset is selected. Other features or candidate features can also be collected. The features also represent a dataset of features that can be used with a trained model to estimate a percentage of faulty ReRAM cells in a functional NN.

The table 400 includes different simulations and columns of features and labels that correspond to the different simulations. The features include the mean values 410, 420, of the observed dynamic power before and after a changepoint, standard deviation values 430, 440, of the dynamic power before and after the changepoint, density-estimation loss 450, average weight of parameters of the ReRAM crossbar 460, average weight of input dataset values 470, and core index identifier 480 that indicates the particular ReRAM crossbar. Element 480 is used to indicate that other features can also be collected. The labels refer to the percentage of faulty cells that are injected for training.

Figure 5:
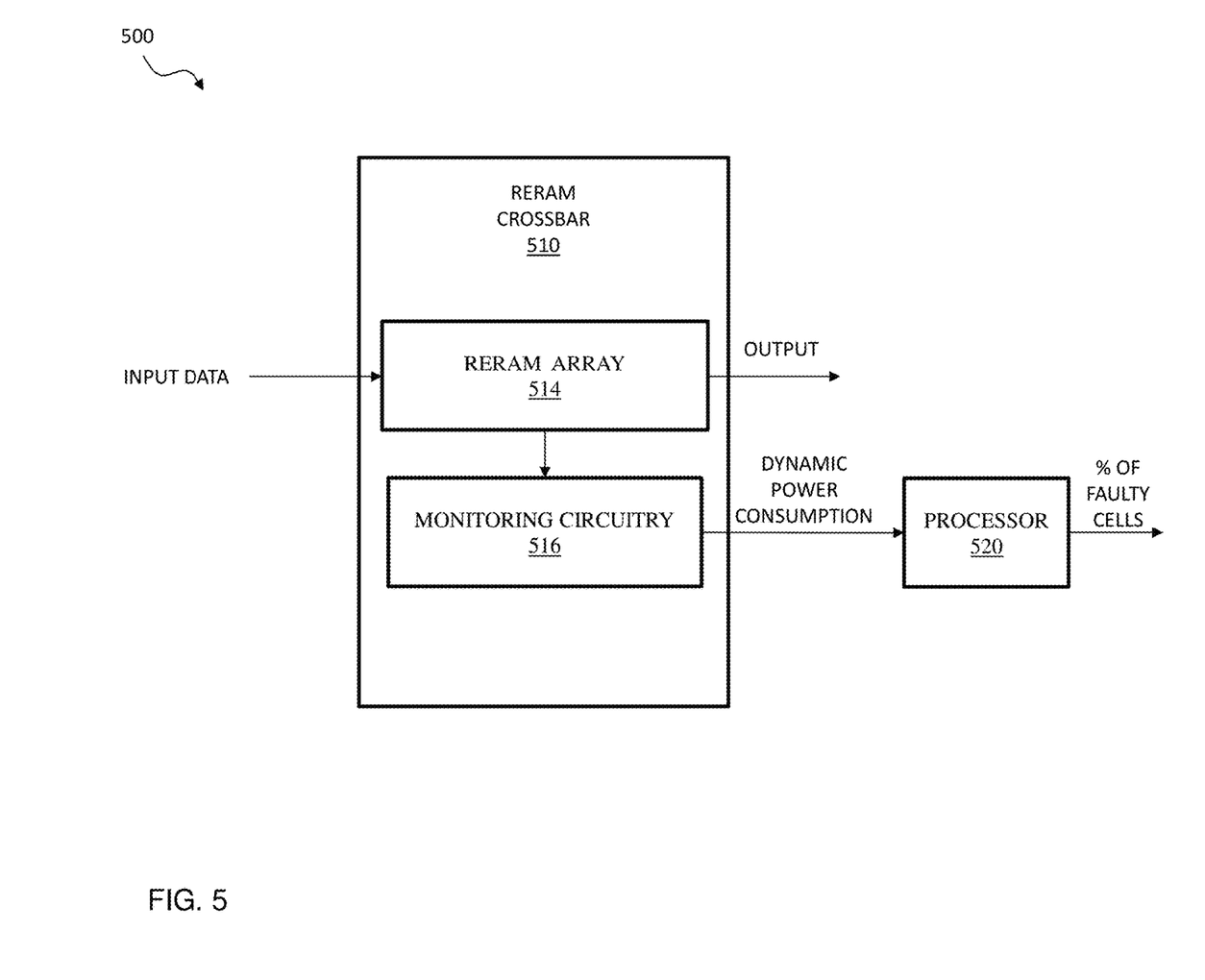
FIG. 5 illustrates a block diagram of an example of a system for estimating a percentage of faulty cells in a ReRAM crossbar.

FIG. 5 illustrates a block diagram of an example of a system 500 for estimating a percentage of faulty cells in a ReRAM crossbar. The system 500 includes a ReRAM crossbar 510 and a processor 520. The system 500 can include other components, such as a memory.

The ReRAM crossbar 510 includes a ReRAM array 514 and monitoring circuitry 516. The ReRAM array can be a conventional array of ReRAM cells. The ReRAM array 514 receives an input dataset and provides an output. The ReRAM crossbar 510 can be used as neuromorphic hardware for a NN. As such, the input dataset can datapoints (e.g., pixel values) of an image and the output can indicate classification of the image.

The monitoring circuitry 516 is configured to monitor dynamic power of the ReRAM array 514 during computations. The monitoring circuit 516 can monitor the dynamic power directly or indirectly. For indirect monitoring, logical ones in output sequences can be counted. FIG. 6 provides and example of direct measurement using sensors and FIG. 7 provides an example of indirect measurement using an adder tree for counting the logical ones.

The processor 520 is configured to receive the dynamic power consumption from the monitoring circuitry, detect changepoints, and provide a percentage of faulty cells of the ReRAM array when changepoints are detected. The processor 520 can be, for example, integrated on a chip with the ReRAM crossbar. The processor 520 can be, for example, a CPU or a GPU.

FIG. 6 illustrates a diagram of an example of ReRAM crossbar 600 using current sensors as monitoring circuitry. The ReRAM crossbar can be crossbar 510 of FIG. 5. The ReRAM crossbar 600 includes a ReRAM array 610 and current sensors 620. The ReRAM array 610 includes word lines, bit lines, and ReRAM cells connecting the word lines to the bit lines. One of the current sensors 620 is coupled to a different one of the bit lines. The current sensors 620 are used to monitor the dynamic power consumption of the ReRAM array 610 and provide the measured power for changepoint detection and estimation of percentage of faulty cells of the ReRAM array 610. The outputs of each of the current sensors 620 can be provided to a processor, such as the processor 520 of FIG. 5.

FIG. 7 illustrates a diagram of an example of ReRAM crossbar 700 using an adder tree as monitoring circuitry. The ReRAM crossbar can be crossbar 510 of FIG. 5. The ReRAM crossbar 700 includes a ReRAM array 710 and an adder tree 720. The ReRAM crossbar 700 also includes additional corresponding peripheral circuits with the ReRAM array 710 that are not specifically denoted in FIG. 7, such as a wordline decoder, and read out circuits. In the presence of faults, the output current and the quantized outputs of the sense amplifiers change. Moreover, the accumulated outputs of one layer are sent to the next layer as inputs. Since the resolution of DACs is set to 1 bit to save area overhead, multi-bit outputs are converted to a sequence of binary values and stored in the corresponding registers. When the i-th bit of the original output number is 0, the input bit line is connected to ground. When the i-th bit is 1, the input bit line is connected to the read voltage. In this way, the read voltage that is applied at the input of the transmission gates can pass to the bit lines and the weighted sums are read out through the selected lines. Therefore, the dynamic read power of the ReRAM array 710 and the word-line decoder is determined by the number of logic ones in the output sequence from the previous layer.

The adder tree 720 is used to determine the number of logic ones. The adder and shift-register pair at the bottom of the ReRAM array 710 is used to calculate accumulated outputs, and the most significant 8 bits (B0 to B7) of these outputs from each pair are sent to the next layer as inputs.

In order to count the number of ones in the binary format of each output number, two full-adders, one half-adder, one 2-bit adder and one 3-bit adder are used (illustrated in the dashed rectangle in FIG. 7). Next, a hierarchical adder tree is used to calculate the total number of ones from all 128 outputs. The output from the adder tree 720 can be provided to a processor, such as the processor 520 of FIG. 5, to determine changepoints and estimate a percentage of faulty cells of the ReRAM array 710. The ReRAM crossbars of FIGS. 5, 6, and 7 can be used as the neuromorphic hardware of NN, such as a convolution neural network (CNN) or a DNN, or another RCS. The NNs can include multiple of the ReRAM crossbars.

Figure 8:
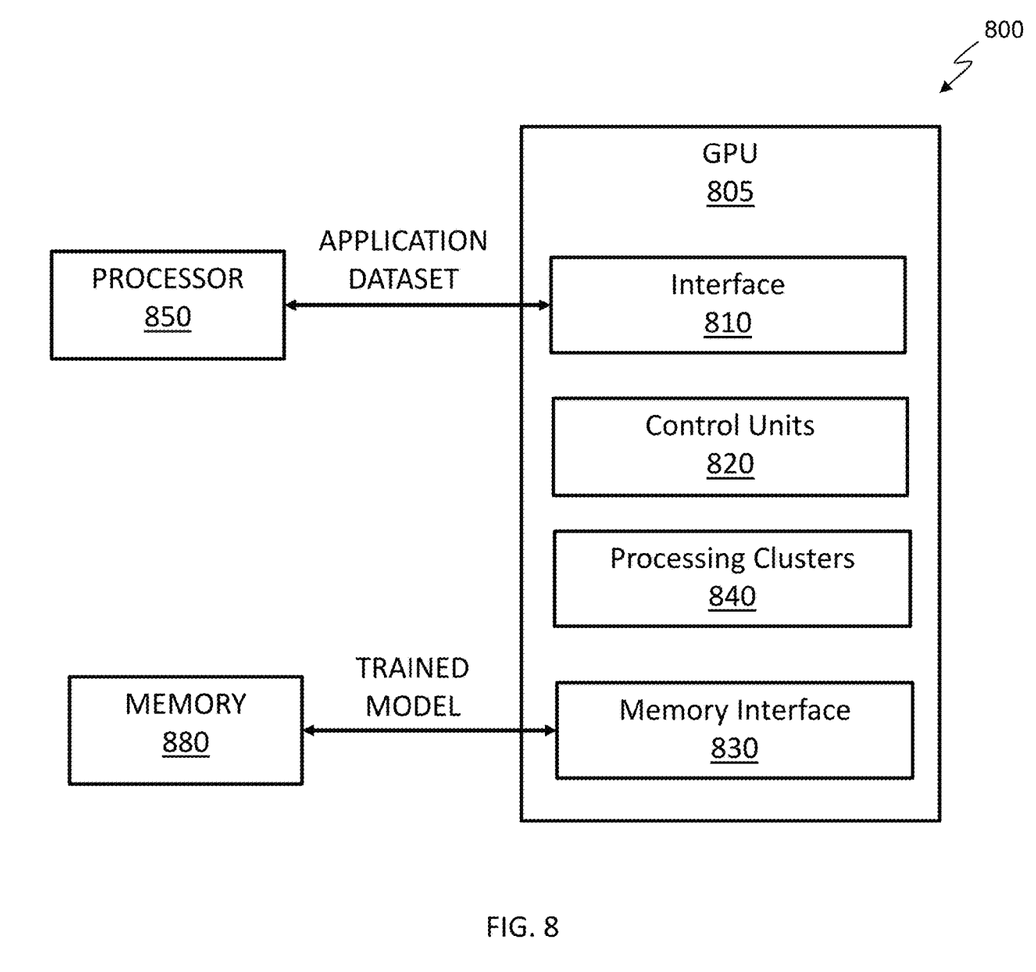
FIG. 8 illustrates a block diagram of an example of a computing system in which at least a portion of the disclosed systems, methods, or apparatuses disclosed herein can be implemented.

At least a portion of methods discussed with respect to FIGS. 100, 200, and 300 can be implemented as a computer program product having a series of operating instructions stored on a non-transitory computer-readable medium that directs a processor when executed thereby to perform operations of the method. The processor can be a CPU or a GPU. Algorithms corresponding to at least a portion of the methods can be stored on a memory and used to direct the operation of a processor. FIG. 8 provides an example of a computing system having a memory and a processor that can be used for at least a portion of the methods or systems disclosed herein.

FIG. 8 illustrates a block diagram of an example of a computing system 800 in which at least a portion of the disclosed systems, methods, or apparatuses disclosed herein can be implemented. Computing system 800 provides an example of a parallel processing unit, GPU 805, included in a system with one or more other devices. Computing system 800 can be embodied on a single semiconductor substrate and can include other devices such as additional GPUs. GPU 805 can be coupled to the additional GPUs via one or more interconnects, such as high-speed interconnects. GPU 805 can be coupled to processor 850, such as or host processor and a memory 880. The processor 850 can be another GPU or a host processor such as a CPU. The memory 880 can include multiple memory devices. GPU 805 includes an interface 810, control units 820, a memory interface 830, and processing cluster 840. GPU 805 can include additional components that are not illustrated but typically included in a GPU, such as communication busses and interconnects. The computing system 800, or at least a portion of the computing system, can be on a cloud computing platform. For example, the GPU 805, the processor 850, the memory 880, or a combination of two or more can be on a server located in a cloud computing environment, such as in a data center. The data center can be a GPU data center. The computing system 800 can be or can be at least a portion of an AI system, such as an autonomous driving system or a vision system. The computing system 800 can also be a gaming system, such as a cloud-based gaming system. One or more of the GPU 805, the processor 850, and the memory 880 can also be distributed on different computing devices and the computing devices can be distal from one another. For example, the processor 850 and memory 880 can be located on one computing device or system and the GPU 805 can be located on another computing device or system.

Interface 810 is an input and output interface configured to communicate data, commands, and other information, with external components, such as the processor 850. Interface 810 can transmit and receive data and commands over conventional interconnects. The interface 810 can be receive input data, such as an application dataset. Received communications can be sent to the various components of GPU 805, such as control units 820. Control units 820 are configured to manage processing streams, configure processing cluster 840 for processing tasks defined by the streams, distribute the tasks to processing cluster 840, and manage the execution of the tasks on processing cluster 840. The results generated by the tasks can be directed to memory interface 830. Memory interface 830 is configured to store the results in a memory, such as memory 880. For example, at least a portion of a trained model can be stored in the memory 880. In addition to writing to memory 880, memory interface 830 is also configured to read data from memory 880. The memory 880 can also store software or code corresponding to algorithms, such as the changepoint detection algorithms as represented herein. The code can direct operations of the processing cluster 840. The memory 880 can be or include a non-transitory computer readable medium.

Processing cluster 840 includes multiple processing cores for processing the tasks. The processing cores can be optimized for matrix math operations and can be employed for training NNs. The processing cores can be ReRAM crossbar. Processing cluster 840 can include a pipeline manager that directs the operation of the processing cores for parallel processing of the tasks. Processing cluster 840 can also include additional components for processing the tasks, such as a memory management unit. A trained model as disclosed herein can be used to estimate a percentage of faulty cells of the processing cores.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

The processors or computers can be part of GPU racks located in a data center. The GPU racks can be high-density (HD) GPU racks that include high performance GPU compute nodes and storage nodes. The high performance GPU compute nodes can be servers designed for general-purpose computing on graphics processing units (GPGPU) to accelerate deep learning applications. For example, the GPU compute nodes can be servers of the DGX product line from Nvidia Corporation of Santa Clara, Calif.

The compute density provided by the HD GPU racks is advantageous for AI computing and GPU data centers directed to AI computing. The HD GPU racks can be used with reactive machines, autonomous machines, self-aware machines, and self-learning machines that all require a massive compute intensive server infrastructure. For example, the GPU data centers employing HD GPU racks can provide the storage and networking needed to support large-scale deep neural network (DNN) training.

The NNs disclosed herein include multiple layers of connected nodes that can be trained with input data to solve complex problems. Once the NNs are trained, the NNs can be deployed and used to identify and classify objects or patterns in an inference process through which a NN extracts useful information from a given input.

During training, data flows through the NNs in a forward propagation phase until a prediction is produced that indicates a label corresponding to the input. When the NNs do not correctly label the input, errors between the correct label and the predicted label are analyzed, and the weights are adjusted for features of the layers during a backward propagation phase that correctly labels the inputs in a training dataset. With thousands of processing cores that are optimized for matrix math operations, GPUs such as noted above are capable of delivering the performance required for training NNs for artificial intelligence and machine learning applications.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the Summary may have one or more of the additional features of the dependent claims in combination. It is noted that as used herein and in the appended claims, the singular forms "a", "an", and "the" include plural referents unless the context clearly dictates otherwise.

Those skilled in the art to which this application relates will appreciate that other and further additions, deletions, substitutions and modifications may be made to the described embodiments.

What is claimed is:

1. An on-line method of detecting hardware faults in a ReRAM-based neural network, comprising:
monitoring dynamic power consumption of a ReRAM crossbar of a neural network during operation of the neural network;
estimating a percentage of faulty cells of the ReRAM crossbar when detecting a changepoint in the dynamic power consumption during the monitoring; and
performing error recovery on the ReRAM crossbar based on the percentage of faulty cells.

2. The on-line method as recited in claim 1, wherein the monitoring includes counting a number of logic ones output by the ReRAM crossbar and detecting a changepoint is based on the number of logic ones.

3. The on-line method as recited in claim 2, wherein counting the number of logic ones is performed by an adder tree.

4. The on-line method as recited in claim 1, wherein the monitoring includes employing one or more sensors for measuring the dynamic power consumption of the ReRAM crossbar and for detecting a changepoint.

5. The on-line method as recited in claim 4, wherein the one or more sensors are current sensors connected to bit-lines of the ReRAM crossbar.

6. The on-line method as recited in claim 1, further comprising extracting features from the neural network during the operation thereof and estimating the percentage of faulty cells based on the extracted features and a trained model.

7. The on-line method as recited in claim 6, wherein the features include one or more of a mean value of the power before and after the changepoint, a standard deviation value of the power before and after the changepoint, a density-estimation loss from mathematically determining the changepoint, average weight of parameters in the ReRAM crossbar, average value of input pixels, and a core index identifier.

8. The on-line method as recited in claim 6, wherein the trained model is a Support Vector Machine (SVM)-based estimation model.

9. The on-line method as recited in claim 1, wherein the monitoring includes detecting the changepoint within a sliding window of computing cycles of the neural network.

10. The on-line method as recited in claim 1, further comprising interrupting the operation of the neural network based on the percentage of the faulty cells.

11. The on-line method as recited in claim 10, further comprising restarting the operation of the neural network after performing the error recovery.

12. The on-line method as recited in claim 1, performing the error recovery occurs when the percentage of faulty cells is greater than a predetermined threshold.

13. The on-line method as recited in claim 1, wherein the changepoint is a location of an abrupt change in time-series data of the dynamic power consumption.

14. The on-line method as recited in claim 1, further comprising performing a changepoint detection process during the monitoring for detecting changepoints, wherein the changepoint detection process is repeated after an initial detection of the changepoint.

15. The on-line method as recited in claim 14, wherein the changepoint detection process is conducted within a time-window and when repeated, a data point of the initial changepoint detection is removed from the time-window, remaining data points of the time-window are shuffled, and the initial changepoint is confirmed when a changepoint is detected in the repeated changepoint detection process.

16. A computer program product having a series of operating instructions stored on a non-transitory computer-readable medium that directs a processor when executed thereby to execute operations for one or more of the monitoring, estimating, or performing steps of the method of claim 1.

17. A computing system including a processor that performs the monitoring, estimating, and performing steps of the method of claim 1.

18. A method of training a machine learning (ML) model for estimating a percentage of faulty cells in a ReRAM based neural network, comprising:

applying a known number of faults on a ReRAM crossbar of a neural network, wherein the known number of faults corresponds to a known percentage of faulty cells for the ReRAM crossbar;

applying a known input to the neural network;

monitoring the neural network during processing of the known input;

extracting a dataset of features from the neural network during the monitoring; and correlating the dataset of features with the known percentage of faulty cells.

19. The method of training as recited in claim 18, wherein the known number of faults are randomly inserted into the ReRAM crossbar.

20. The method of training as recited in claim 18, further comprising wherein the features include at least one of a mean value of dynamic power before and after a changepoint in dynamic power consumption during the monitoring, a standard deviation value of the dynamic power before and after the changepoint, a density-estimation loss from mathematically determining the changepoint, average weight of parameters in the ReRAM crossbar, average value of input pixels, or a core index identifier.

21. The method of training as recited in claim 18, wherein the ML model is a Support Vector Machine (SVM) model.

* * * * *